Patented Aug. 30, 1938

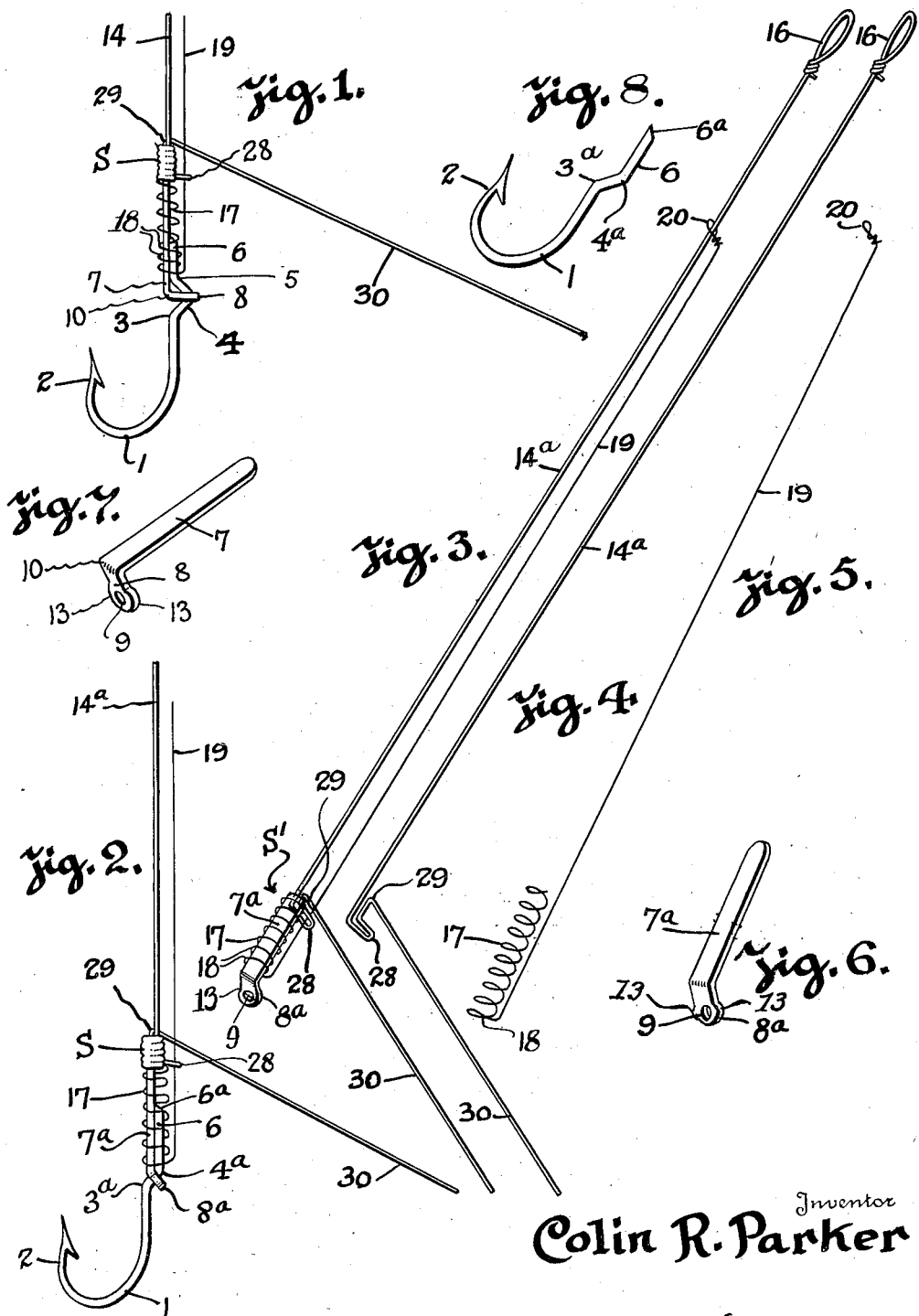

2,128,315

UNITED STATES PATENT OFFICE 2,128,315

FISHING DEVICE

Colin R. Parker, Newport, R. I.

Application June 15, 1937, Serial No. 148,397

6 Claims. (Cl. 43—29)

The object of my invention is to provide a novel fish hook which can be readily detached from the line for the purpose of releasing a fish from the hook more easily and in a more humane manner than by withdrawing the hook forcibly as is the usual method.

It is also an object of my invention to provide means for readily detaching the line from the hook to save the time and patience of the fisherman.

It is also an object of my invention to provide a novel offset wire guard to prevent the fish from swallowing the hook.

I attain these and other objects of my invention by the mechanism illustrated in the accompanying drawing, in which—

Figure 1 is a side elevation of the modified form of the invention showing the offset guard wire 30;

Fig. 2 is a side elevation of my improved and preferred form of the invention in which the hook is provided with an offset shank;

Fig. 3 is a side elevation of the leader 14a, of which the wire 30 is an extension, the relation of coil 17 in this view to either plate 7 or plate 7a being identical with its relation to those plates as shown in Figs. 1 and 2 of the drawing.

Fig. 4 is a similar view with the wire 19 omitted;

Fig. 5 is a detail view of the wire 19;

Fig. 6 is a perspective view of plate 7a;

Fig. 7 is a detail perspective view of plate 7; and

Fig. 8 is a detail side elevation of the form of hook shown in Fig. 2 of the drawing, with an offset shank.

Like characters of reference designate like parts in each of the several views.

Referring to the accompanying drawing, I provide a fish hook 1 having the usual barb 2 but having a shank bent at 3 to form a V-shaped outwardly bend 4, the shank again being bent at 5 and terminating in the shank end 6.

I provide a novel plate consisting of a body having a right angled bevel at 10 to form the bent end 8. End 8 has lateral ears or extensions 13. Bent end 8 is provided with an aperture 9 of suitable size to loosely or detachably receive the shank of the fish hook.

I provide a leader or line 14 tightly secured to the plate 7 by suitable means such as the solder S. The member 14 has the usual loop 16 to which a conventional fish line may be attached.

I provide a coiled wire 17 having its upper end secured to the plate by the solder S, as shown in Figs. 1 and 2, the coiled wire 17 being of sufficient length to normally engage over the shank 6, as shown in Fig. 1. The coil 17 at its lower end 18 is bent and is integral and continuous with wire 19 which is threaded through the loop 28, as shown in Fig. 3 and terminates in the loop 20 formed by looping the wire and bending it around the main body of wire 19, as shown in Figs. 3 and 4, the loop 20 loosely engaging the line 14.

Referring to Fig. 1, I provide an offset guard wire 30 which is fastened at 29 with solder S to the member 7a. The function of guard wire 30 is to prevent a fish from swallowing the hook.

To operate the device the fisherman pulls the wire 19 which in turn contracts the spiral 17 so that it becomes disengaged from the shank 6 of the fish hook 1, thus allowing the shank of the fish hook to slip through the aperture 9 of the bent end 8 and become disengaged from the line, thereby making it unnecessary to forcibly withdraw the hook in the usual manner and thus saving the time and patience of the fisherman and involving a more humane treatment of the fish.

Referring to Figs. 2 to 7, there is illustrated an improved modification of my invention which is my preferred form. In this form of my invention I provide a hook 1 which is bent at 3a and 4a to provide a shank 6a offset from and extending parallel with the body of the hook, as shown in Fig. 2. I provide a plate 7a having a slightly enlarged offset end 8a, bent at an obtuse angle to the body of the plate and provided with an eye 9 to receive the shank 6 of the hook and with opposite lateral ears 13.

The leader 14a at its end is upturned and bent back on itself at 28, as shown in Fig. 3, and again bent at 29 to provide an offset wire guard 30 projecting, as shown in Fig. 2 of the drawing. The wire 19 by which the spiral 17 may be compressed to disengage the shank of the hook when it is to be detached extends between the wires at loop 28, as shown in Fig. 3. This form of the invention makes it very easy to disengage the hook when the wire 19 and spiral 17 are compressed. The wire guard 30 prevents the fish from swallowing the hook.

What I claim is:—

1. In a fishing device, the combination of a fish hook having a V-shaped bend formed in its shank, a plate having an angularly bent end, the bent end having an aperture of suitable size to loosely receive the shank of the aforesaid fish hook, lateral ears on the plate, a wire having a coil at one end, one end of said coil being fastened to the plate and the other end of said coil detachably engaging the end of the fish hook, said wire having a strand of substantial length, said strand terminating in a loop, and a leader affixed to the plate and loosely engaged by the aforesaid loop of the wire, whereby a pull on the wire will contract the coil and permit disengagement of the fish hook from the plate.

2. In a fishing device, the combination of a fish hook having a V-shaped bend formed in its shank, a plate having an angularly bent end, said bent end having an aperture of suitable size to loosely receive the shank of the aforesaid fish hook, lateral extensions on the plate, a wire having a coil at one end, one end of said coil being fastened to the plate and the other end of said coil detachably engaging the end of the fish hook, said wire having a strand of substantial length, and a leader affixed to the plate, the leader having a loop through which said strand passes, said strand terminating in a loop, the leader being loosely engaged by the last mentioned loop, whereby a pull on the wire will contract the coil and permit disengagement of the fish hook from the plate.

3. In a fishing device, the combination of a fish hook having a bend and having its shank offset, a plate having an angularly bent lower end, said end having an aperture of suitable size to loosely receive the shank of the aforesaid fish hook, means for securing said plate to a leader, a wire having a coil at one end, one end of said coil being anchored and the other end of said coil detachably engaging the offset shank of the fish hook, said wire having a strand of substantial length, and a leader having its lower portion bent to form a loop through which said strand passes, said strand terminating in a loop loosely engaging the leader, the leader being affixed to the aforesaid plate, the said leader terminating in an offset projection adapted to function as a guard to prevent a fish from swallowing the hook.

4. In combination with the fishing device defined in claim 1, an offset guard wire to prevent a fish from swallowing the hook.

5. In a fishing device, the combination of a fish hook having a bend and having its shank offset, a plate having an angularly bent lower end, said end having an aperture of suitable size to loosely receive the shank of the aforesaid fish hook, means for securing said plate to a leader, a wire having a coil at one end, one end of said coil being anchored and the other end of said coil detachably engaging the offset shank of the fish hook, said wire having a strand of substantial length, and a leader having its lower portion bent to form a loop through which said strand passes, said strand terminating in a loop loosely engaging the leader, the leader being affixed to the aforesaid plate.

6. In a fishing device, the combination of a fish hook having a bend, a plate having an angularly bent lower end, said end having an aperture of suitable size to loosely receive the shank of the aforesaid fish hook, means for securing said plate to a leader, a wire having a coil at one end, one end of said coil being anchored and the other end of said coil detachably engaging the offset shank of the fish hook, said wire having a strand of substantial length, and a leader having its lower portion bent to form a loop through which said strand passes, said strand terminating in a loop loosely engaging the leader, the leader being affixed to the aforesaid plate, the said leader terminating in an offset projection adapted to function as a guard to prevent a fish from swallowing the hook.

COLIN R. PARKER.